(12) United States Patent
Harmon et al.

(10) Patent No.: US 7,283,899 B1
(45) Date of Patent: Oct. 16, 2007

(54) VEHICLE ALTERNATOR AND METHODS FOR CONTROLLING TORQUE LOADING OF THE VEHICLE ALTERNATOR ON AN ENGINE

(75) Inventors: Jack D. Harmon, Carmel, IN (US); Michael D. Bradfield, Anderson, IN (US)

(73) Assignee: Remy International, Inc., Anderson, IN (US)

( * ) Notice: Subject to any disclaimer, the term of this patent is extended or adjusted under 35 U.S.C. 154(b) by 0 days.

(21) Appl. No.: 11/676,817

(22) Filed: Feb. 20, 2007

(51) Int. Cl.
*G06F 7/00* (2006.01)
(52) U.S. Cl. .......................... 701/36; 322/23; 322/28; 322/29; 322/25
(58) Field of Classification Search .................. 701/1, 701/36; 322/23, 28, 29, 25, 27, 8, 73; 180/65.1–65.8; 290/5
See application file for complete search history.

(56) References Cited

U.S. PATENT DOCUMENTS

| 6,859,156 | B2 * | 2/2005 | May et al. .................. 341/144 |
| 7,009,365 | B1 | 3/2006 | Namuduri et al. |
| 7,044,255 | B2 * | 5/2006 | Maeda et al. ............... 180/242 |
| 7,224,144 | B2 * | 5/2007 | Inokuchi et al. .............. 322/24 |

* cited by examiner

*Primary Examiner*—Richard M. Camby
(74) *Attorney, Agent, or Firm*—Cantor Colburn LLP

(57) ABSTRACT

A vehicle alternator and methods for controlling an amount of torque loading of the vehicle alternator on an engine are provided. The vehicle alternator utilizes a voltage regulator with a microprocessor to control an amount of torque loading, based on a rotational speed of a rotor of the alternator, or an amount of current output by the alternator, or both.

14 Claims, 6 Drawing Sheets

VEHICLE ALTERNATOR AND METHODS FOR CONTROLLING TORQUE LOADING OF THE VEHICLE ALTERNATOR ON AN ENGINE

TECHNICAL FIELD

This application relates to a vehicle alternator and methods for controlling torque loading of the vehicle alternator on an engine.

BACKGROUND

An engine control module has been described there controls operation of an alternator to control torque loading on engine. A problem associated with this configuration is that when communication is interrupted between the engine control module and the alternator, the alternator may not be able to control torque loading on the engine.

Accordingly, the inventors herein have recognized a need for an improved alternator and methods for controlling the alternator that minimizes the above mentioned deficiencies.

SUMMARY OF THE INVENTION

A method for controlling an amount of torque loading of a vehicle alternator on an engine in accordance with an exemplary embodiment is provided. The alternator has a rotor, a stator, and a voltage regulator. The voltage regulator has a microprocessor. The method includes determining a first value indicative of a rotational speed of the rotor at the first time, utilizing the microprocessor in the voltage regulator. The method further includes determining a second value indicative of an amount of current being output by the stator of the alternator at substantially the first time, utilizing the microprocessor. The method further includes determining a first torque loading value that is indicative of a relative amount of torque loading associated with the alternator, based on first and second values, utilizing the microprocessor. The method further includes determining a third value indicative of a rotational speed of the rotor at a second time, utilizing the microprocessor. The second time is after the first time. The method further includes determining a fourth value indicative of an amount of current being output by the stator of the alternator at substantially the second time, utilizing the microprocessor. The method further includes determining a second torque loading value that is indicative of the relative amount of torque loading associated with the alternator, based on third and fourth values, utilizing the microprocessor. The method further includes adjusting a duty cycle of a signal being applied to the field coil of the rotor based on the first and second torque loading values such that the amount of torque loading of the alternator is maintained within a desired torque loading range.

A vehicle alternator in accordance with another exemplary embodiment is provided. The vehicle alternator includes a rotor having a field coil. The vehicle alternator further includes a stator operably disposed around the rotor. The stator is configured to output a voltage in response to rotation of the rotor. The vehicle alternator further includes a voltage regulator having a microprocessor operably coupled to the stator. The microprocessor is configured to determine a first value indicative of a rotational speed of the rotor at the first time. The microprocessor is further configured to determine a second value indicative of an amount of current being output by the stator of the alternator at substantially the first time. The microprocessor is further configured to determine a first torque loading value that is indicative of a relative amount of torque loading associated with the alternator, based on first and second values. The microprocessor is further configured to determine a third value indicative of a rotational speed of the rotor at a second time. The second time is after the first time. The microprocessor is further configured to determine a fourth value indicative of an amount of current being output by the stator of the alternator at substantially the second time. The microprocessor in further configured to determine a second torque loading value that is indicative of the relative amount of torque loading associated with the alternator, based on third and fourth values. The microprocessor is further configured to adjust a day cycle of a signal being applied to the field coil of the rotor based on the first and second torque loading values such that an amount of torque loading of the alternator is maintained with a desired torque loading range.

A method for controlling an amount of torque loading of a vehicle alternator on an engine in accordance with another exemplary embodiment is provided. The alternator has a rotor, a stator, and a voltage regulator. The voltage regulator has a microprocessor. The method includes a determining a first value indicative of an amount of current being output by the stator of the alternator at substantially the first time, utilizing the microprocessor in the voltage regulator. The method further includes determining a second value indicative of an amount of current being output by the stator at a second time, utilizing the microprocessor. The second time is after the first time. The method further includes adjusting a duty cycle of a signal being applied to the field coil of the rotor based on the first and second values such that the amount of torque loading of the alternator is maintained within a desired torque loading range, utilizing the microprocessor.

A vehicle alternator in accordance with another exemplary embodiment is provided. The vehicle alternator includes a rotor having a field coil. The vehicle alternator further includes a stator operably disposed around the rotor. The stator is configured to output a voltage in response to rotation of the rotor. The vehicle alternator further includes a voltage regulator having a microprocessor operably coupled to the stator. The microprocessor is configured to determine a first value indicative of an amount of current being output by the stator of the alternator at substantially the first time. The microprocessor is further configured to determine a second value indicative of an amount of current being output by the stator at a second time. The second time is after the first time. The microprocessor is further configured to adjust a duty cycle of a signal being applied to the field coil of the rotor based on the first and second values such that the amount of torque loading of the alternator is maintained within a desired torque loading range.

DESCRIPTION OF EXEMPLARY EMBODIMENTS

Figure 1:
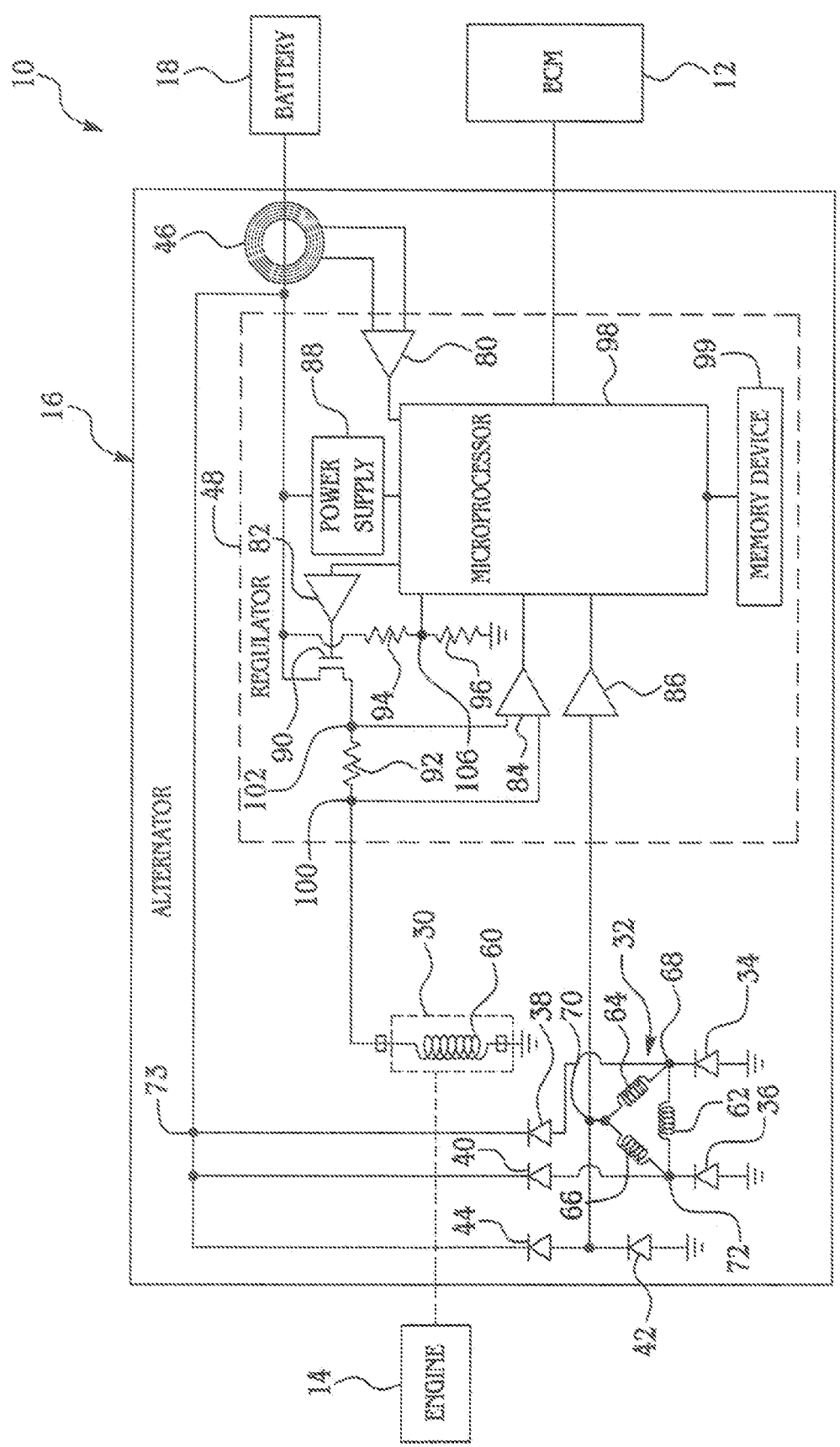
FIG. 1 is a block diagram of a vehicle having an engine, and an alternator in accordance with an exemplary embodiment.

Referring to FIG. 1, a vehicle 10 having a vehicle alternator 16 in accordance with an exemplary embodiment is illustrated. The vehicle 10 further includes an engine control module 12, an engine 14, and a battery 18.

The engine control module 12 is provided to control operation of the engine 14. The engine control module 12 operably communicates with the engine 14 and the alternator 16 via a communication bus. The communication bus is utilized to send and receive data between the engine control module 12 and the alternator 16.

The engine 14 is provided to output a drive torque for moving the vehicle 10. The engine 14 is operably coupled to a rotor 30 of the alternator 16 and rotates the rotor 30.

The alternator 16 is provided to generate an output current that is utilized to electrically charge the battery 18 and is utilized by other electrical devices of the vehicle 10. The alternator 16 includes a rotor 30, a stator 32, diodes 34, 36, 38, 40, 42, 44, a current sensor 46, and a voltage regulator 48. The rotor 30 includes a field coil 60 that receives a signal having a predetermined duty cycle. The stator 32 is operably coupled around the rotor 30. The stator 32 generates an output current having a magnitude that is based on the duty cycle of the signal applied to the field coil 60. The stator 32 includes phase coils 62, 64, 66 coupled in a Y-configuration. In another exemplary embodiment, the phase coils 62, 64, 66 are coupled in a Delta configuration. The phase coil 64 is electrically coupled between a node 70 and a node 68. The phase coil 66 is electrically coupled between a node 70 and a node 72. The phase coil 62 is electrically coupled between the node 72 and the node 68. The diode 34 is electrically coupled between the node 68 and electrical ground, and the diode 36 is electrically coupled between the node 72 and electrical ground. The diode 44 is electrically coupled between the node 70 and a node 73. The diode 40 is electrically coupled between the node 72 and the node 73. The diode 38 is electrically coupled between the code 68 and the node 73.

The current sensor 46 is provided to output a signal indicative of an amount of current being output by the stator 32 at the node 73. The current sensor 46 is electrically coupled to the node 73. The current sensor 46 is further electrically coupled to an amplifier 80 of the regulator 48. The amplifier 80 amplifies the signal from the current sensor 46 and sends the amplified signal to the microprocessor 98 of the regulator 48. The microprocessor 98 utilizes the amplified signal to determine the amount of current being output by the stator 32.

The regulator 48 is provided to control an output voltage and an output current being output by the stator 32. The regulator 48 includes amplifiers 80, 82, 84, 86, a power supply 88, the transistor 90, resistors 92, 94, 96, a microprocessor 98, and a memory device 99. The power supply 88 is configured to provide an operational voltage to the microprocessor 98. The power supply 88 is electrically coupled between the node 73 and a microprocessor 98. The amplifier 82 is provided to amplify a control signal from the microprocessor 98 for a controlling the transistor 90. As illustrated, the amplifier 82 is electrically coupled to a gate terminal of the transistor 90. A drain terminal of the transistor 90 is electrically coupled to the node 73. Further, a source terminal of the transistor 90 is electrically coupled to a node 102. A resistor 92 is electrically coupled between the node 102 and the node 100 which is electrically coupled to the field coil 60 of the rotor 30. During operation, the microprocessor 98 adjusts the control signal output to the amplifier 82 for controlling switching frequency of the transistor 90 to adjust a duty cycle of a signal applied to the field coil 60. Further, by adjusting the duty cycle of a signal applied to the field coil 60 to a desired duty cycle, an amount of current being output by the stator 32 is adjusted to a desired current level.

Further, as illustrated, the resistor 94 is electrically coupled between the node 73 and a node 106. The resistor 96 is electrically coupled between the node 106 and electrical ground. Further, the node 106 is electrically coupled to the microprocessor 98. The microprocessor 98 monitors a voltage at the node 106 to determines the output voltage of the stator 32.

The amplified 84 has first and second input terminals electrically coupled to nodes 100, 102, respectively. Further, the amplifier 84 has an output terminal electrically coupled to the microprocessor 98. The microprocessor 98 monitors a voltage output by the amplifier 84 to determine a switching current received by the field coil 60 and to detect a short circuit fault condition of the field coil 60.

The amplifier 86 is electrically coupled between the node 70 and the microprocessor 98. The amplifier 86 amplifies a signal output at the stator node 70 that is received by the microprocessor 98. The microprocessor 98 is configured to determine a frequency of AC phase voltage of the stator 30 based on the amplified signal from the amplifier 86. Further, the microprocessor 98 is further configured to determine a value indicative of the rotational speed of the rotor 30 based on the frequency of the AC phase voltage of the stator 32.

The microprocessor 98 is provided to control operation of the voltage regulator 48, and in particular to control an amount of current being output by the alternator 16 and an amount of torque loading of the alternator 16 on the engine 14. The microprocessor 98 is electrically coupled to the engine control module 12, the memory device 99, the amplifiers 80, 82, 84, 86, and the power supply 88. The memory device 99 is configured to store computer executable instructions utilized by the microprocessor 98 and associated data for implementing methods that will be described in further detail below.

The battery 18 is electrically coupled to the node 73 and receives a voltage and current from the alternator 16 for charging the battery 18. The battery 18 is configured to supply electrical power to various vehicle electrical components.

Before providing a detailed explanation for controlling an amount of torque loading of the alternator 16 on the engine 14, a brief overview of the electro-mechanical characteristics of the alternator 16 and the engine 14 will be provided. In particular, the torque loading of the alternator 16 on an accessory drive coupled to the engine 14 is dependent upon a number of operational parameters. In particular, an amount of torque loading (T) placed by the alternator 16 on an accessory drive of the engine 14 is a function of the alternator efficiency (n), an output voltage (V) of the alternator, an output current (i) of the alternator 16, and a rotational speed (w) of the rotor 30. The foregoing operational parameters are related according to the following equation: $T=V*i/(n*w)$. At engine idle conditions, the output voltage (V) is relatively constant over a relatively short time period. Further, the alternator efficiency (n) is relatively constant over the relatively small operating region during a time interval of interest. Accordingly, the amount of torque loading (T) can be calculated utilizing the following equation: $T\sim i/w$. Accordingly, by sensing the current (i) and/or the rotor speed (w), the microprocessor 98 can determine a relative torque loading of the alternator 16 on the engine 14.

Figure 3:
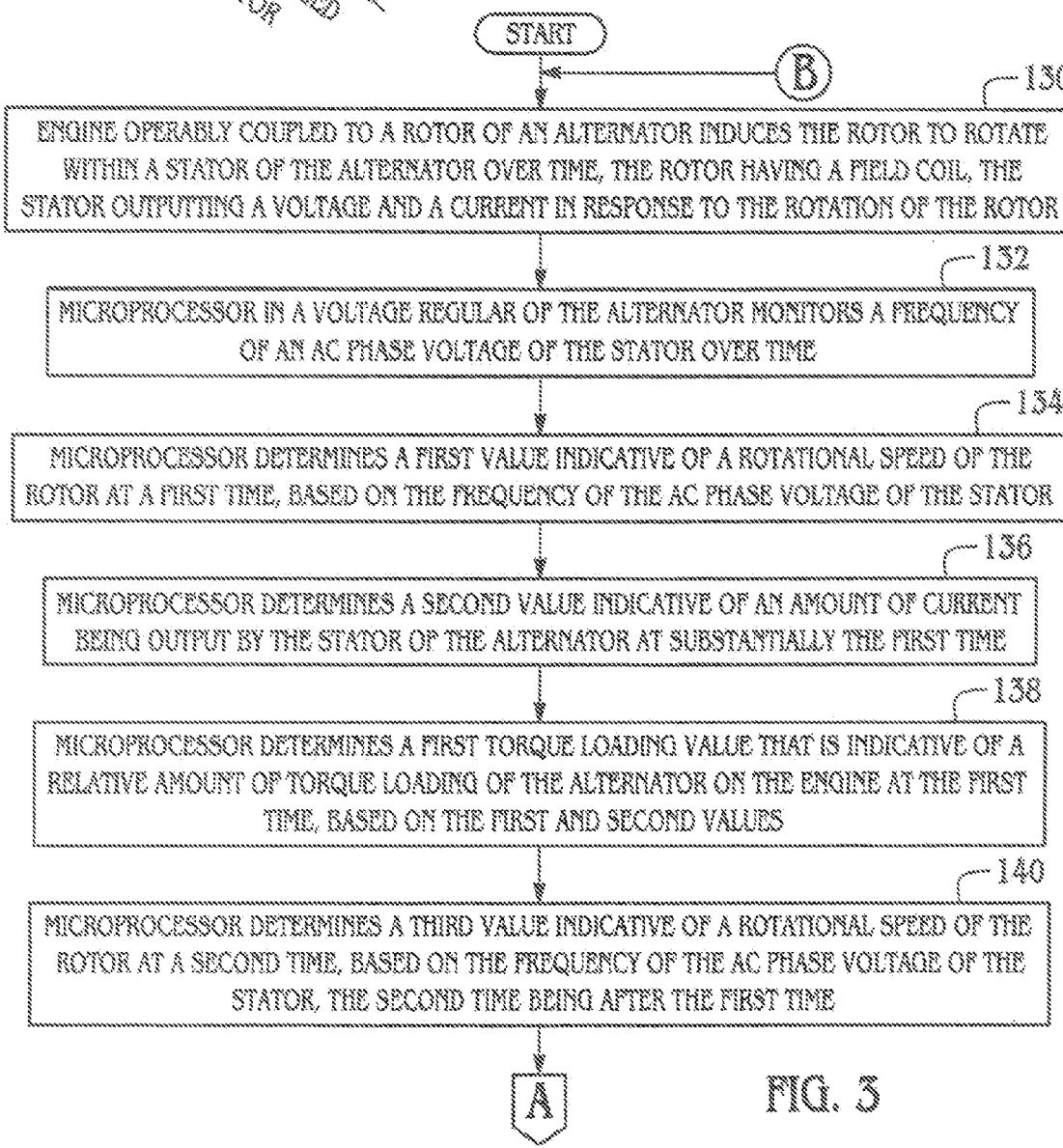
FIGS. 3-4 is a flowchart of a method for controlling an amount of torque loading of a vehicle alternator on an engine in accordance with another exemplary embodiment.
Figure 4:
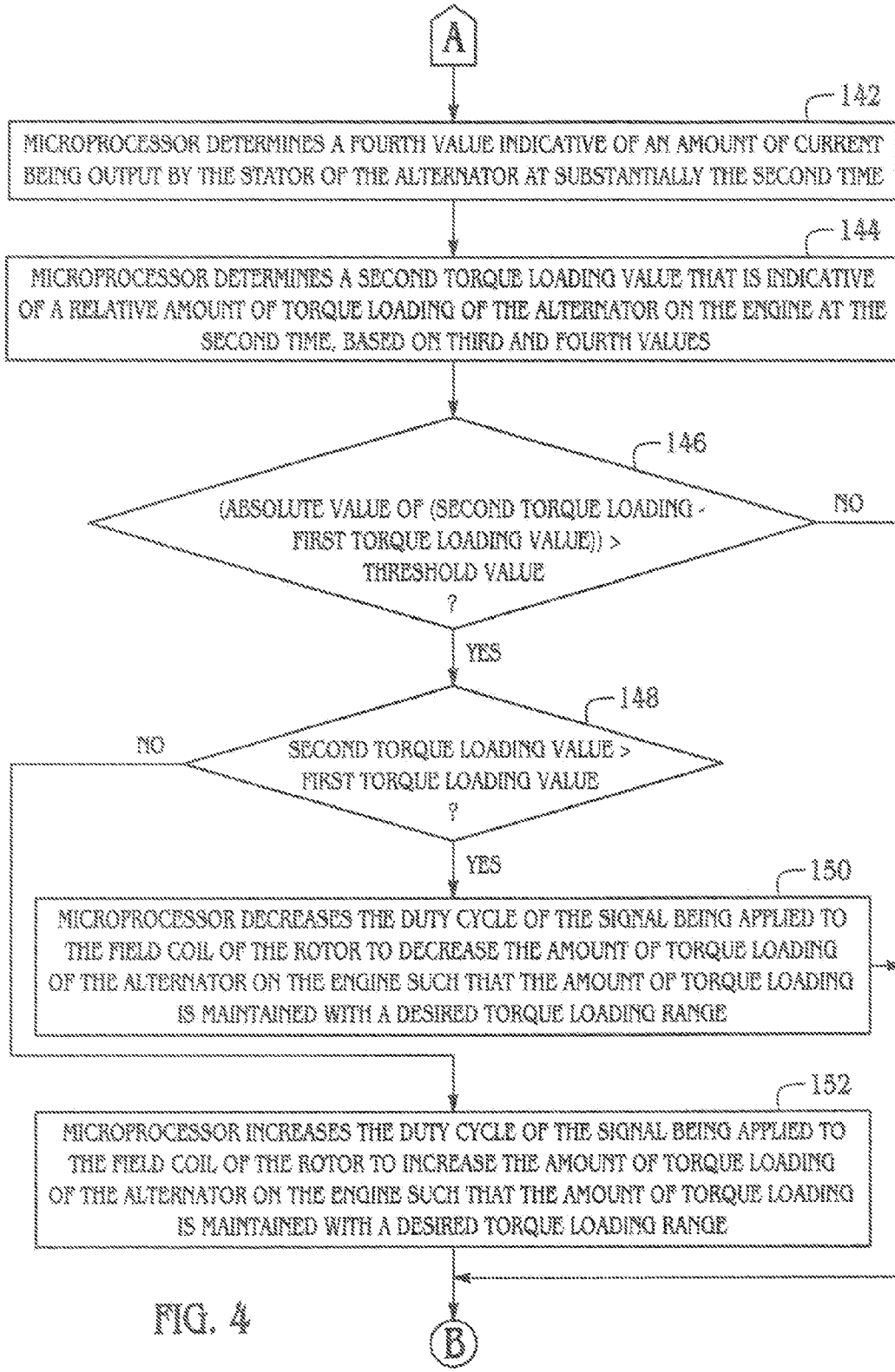
Figure 5:
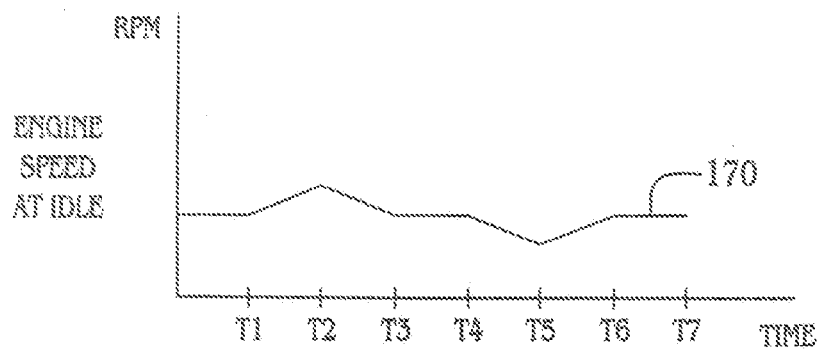
FIG. 5 is an exemplary engine speed signal schematic associated with the engine of FIG. 1.
Figure 6:
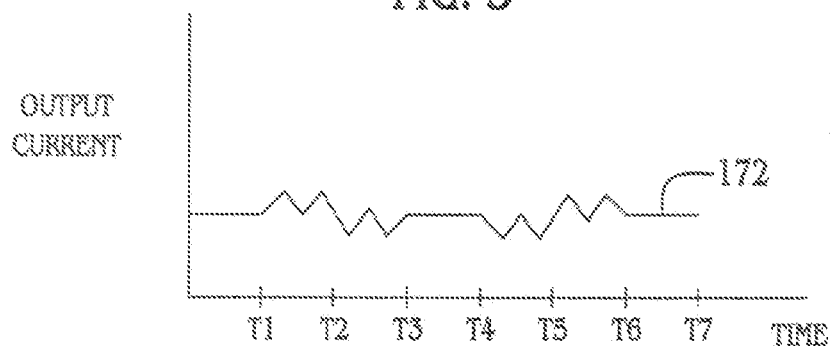
FIG. 6 is an exemplary output current signal schematic associated with the alternator of FIG. 1.
Figure 7:
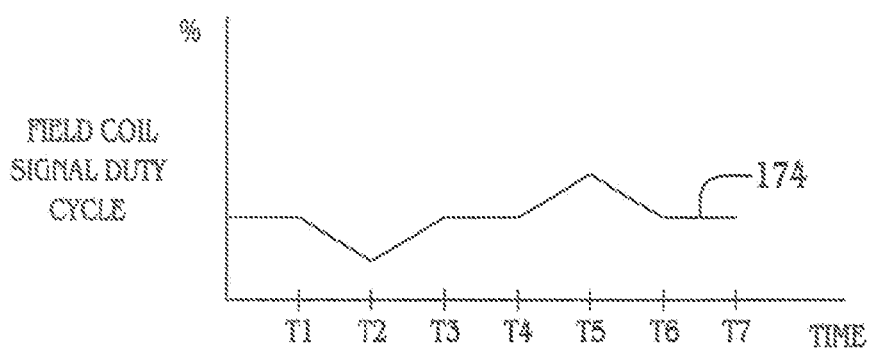
FIG. 7 is an exemplary field coil signal duty cycle schematic associated with the alternator of FIG. 1.
Figure 8:
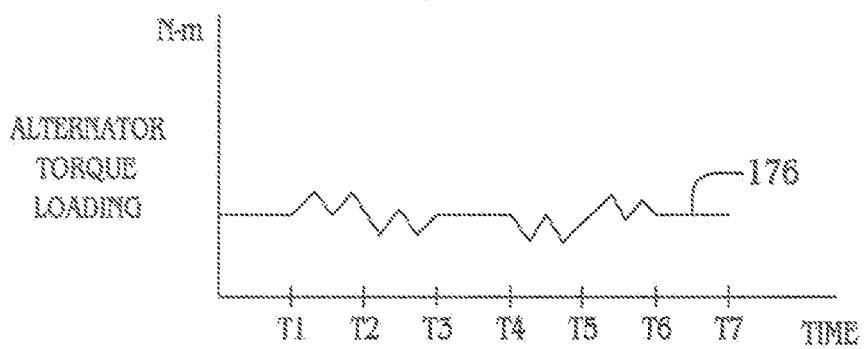
FIG. 8 is an exemplary alternator torque loading signal schematic associated with the alternator of FIG. 1.

Referring to FIGS. 3-4, a method for controlling an amount of torque loading of the alternator 16 on the engine 14 in accordance with another exemplary embodiment will now be explained. The following method can be implemented utilizing the vehicle 10 described above.

At step 130, the engine 14 operably coupled to the rotor 30 of the alternator 16 induces the rotor 30 to rotate within the stator 32 of the alternator 16 over time. The rotor 30 has a field coil 60. The stator 32 outputs a voltage and a current in response to the rotation of the rotor 30.

At step 132, the microprocessor 98 in the voltage regulator 48 of the alternator 16 monitors a frequency of an AC phase voltage of the stator 32 over time.

At step 134, the microprocessor 98 determines a first value indicative of a rotational speed of the rotor 30 at a first time, based on the frequency of the AC phase voltage of the stator 32.

At step 136, the microprocessor 98 determines a second value indicative of an amount of current being output by the stator 32 of the alternator 16 at substantially the first time.

Figure 2:
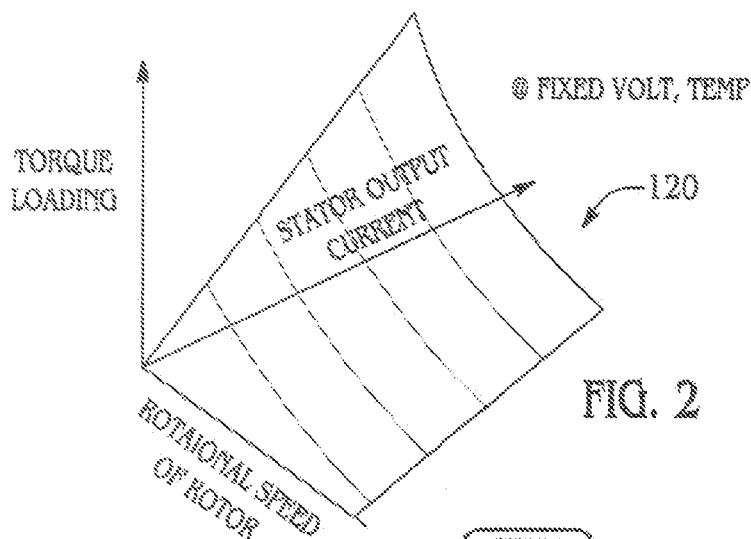
FIG. 2 is an exemplary torque map utilized by the alternator of FIG. 1.

At step 138, the microprocessor 98 determines a first torque loading value that is indicative of a relative amount of torque loading of the alternator 16 on the engine 14 at the first time, based on the first and second values. Referring to FIG. 2, for example, the microprocessor 98 may access a torque map 124 to determine the first torque loading value utilizing the first value indicative of the rotational speed of the rotor 30 and the second value indicative of the amount of current being output by the stator 32.

Referring again to FIGS. 3 and 4, at step 140, the microprocessor 98 determines a third value indicative of a rotational speed of the rotor 30 at a second time, based on the frequency of the AC phase voltage of the stator 32. The second time is after the first time.

At step 142, the microprocessor 98 determines a fourth value indicative of an amount of current being output by the actuator 32 of the alternator 16 at substantially the second time.

At step 144, the microprocessor 98 determines a second torque loading value that is indicative of a relative amount of torque loading of the alternator 16 on the engine 14 at the second time, based on third and fourth values.

At step 146, the microprocessor 98 makes a determination as to whether the absolute value of (Second torque loading value — First torque loading value)) is greater than a threshold value. If the value of step 146 equals "yes", the method advances to step 148. Otherwise, the method returns to step 130.

At step 148, the microprocessor 98 makes a determination as to whether the second torque loading value is greater than a first torque loading value. If the value of step 448 equals "yes", the method advances to step 150. Otherwise, the method advances to step 152.

At step 150, the microprocessor 98 decreases the duty cycle of the signal being applied to the field coil 60 of the rotor 30 to decrease the amount of torque loading of the alternator 16 on the engine 14 such that the amount of torque loading is maintained with a desired torque loading range. At step 150, the method returns the step 130.

At step 152, microprocessor 98 increases the duty cycle of a signal being applied to the field coil 60 of the rotor 30 to increase the amount of torque loading of the alternator 16 on the engine 14 such that the amount of torque loading is maintained with a desired torque loading range. After step 152, the method returns the step 130.

Referring to FIGS. 5-8, a brief description of exemplary signals that may be generated by the vehicle 10 utilizing the method of FIGS. 3-4 will now be discussed. The signal curve 170 indicates an engines speed at an idle operating condition over a time interval. The signal curve 172 indicates an output current of the alternator 16 over the time interval. The signal curve 174 indicates a duty cycle of a signal applied to the field coil 60 over the time interval. The signal curve 176 indicates a relative torque loading of the alternator 16 on the engine 14 over the time interval.

As illustrated, between times T1 and T2, the curve 170 indicatives the engine idle speed increases. Further, the curve 174 indicates the microprocessor 98 decreases the duty cycle of the signal applied to the field coil 60, in response to the increasing engine idle speed. Further, the curve 172 indicates the output current of the alternator 16 is adjusted within a desired range based on the decreasing duty cycle of the signal applied to the field coil 60. Further, the curve 176 indicates the torque loading of the alternator 16 is adjusted within a desired range based on the output current of the alternator 16.

Further, as illustrated, between times T2 and T3, the curve 170 indicates the engine idle speed decreases Further, the curve 174 indicates the microprocessor 98 increases the duty cycle of the signal applied to the field coil 60, in response to the decreasing engine idle speed. Further, the curve 172 indicates the output current of the alternator 16 is adjusted within a desired range based on the increasing duty cycle of the signal applied to the field coil 60. Further, the curve 176 indicates the torque loading of the alternator 16 is adjusted within a desired range based on the output current of the alternator 16.

Figure 9:
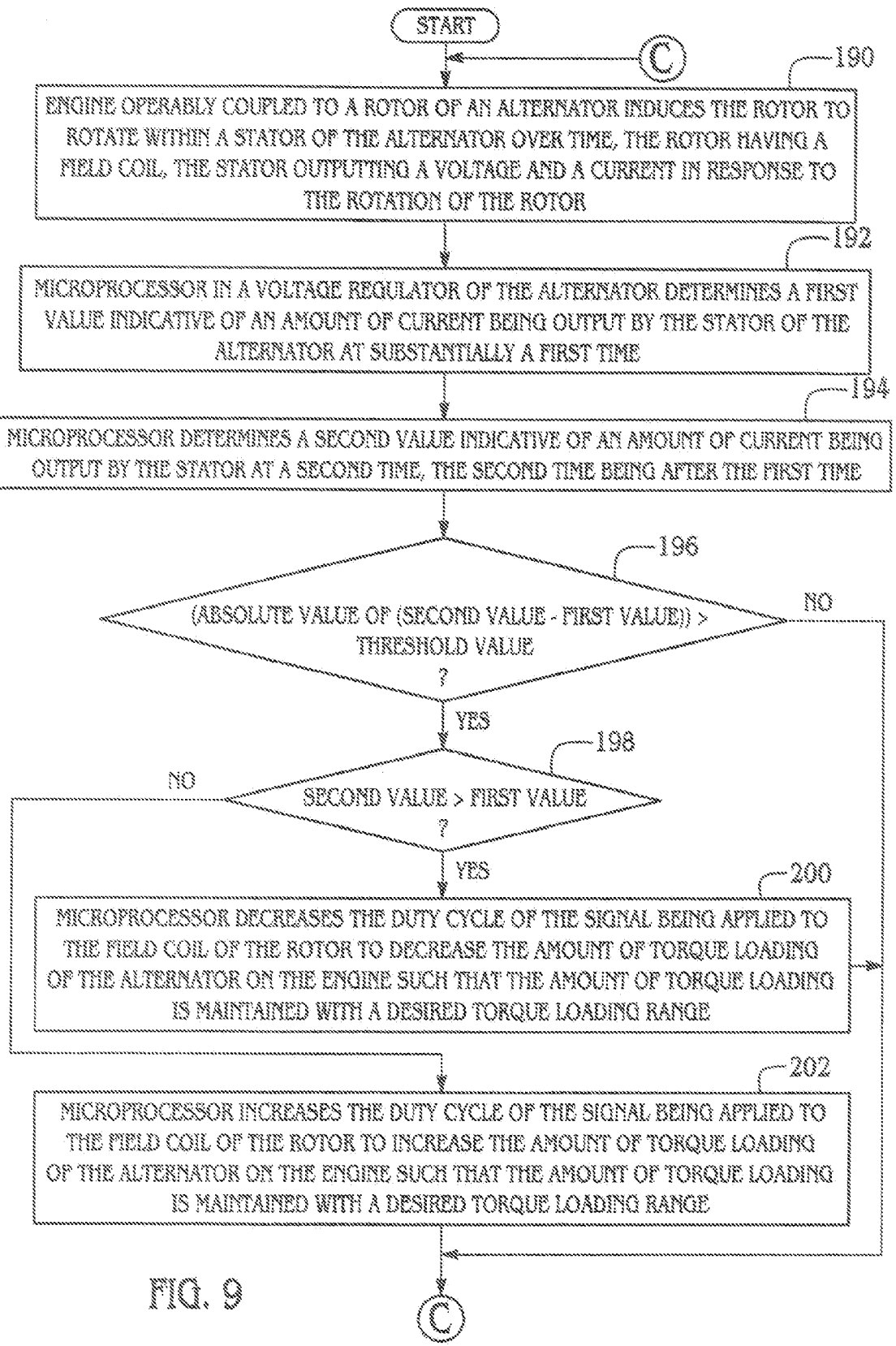
FIG. 9 is a flowchart of a method for controlling on an amount of torque loading of a vehicle alternator on an engine in accordance with another exemplary embodiment.

Referring to FIG. 9, a method for controlling an amount of torque loading of the alternator 16 on the engine 14 in accordance with another exemplary embodiment will now be explained. The following method can be implemented utilizing the vehicle 10 described above.

At step 190, the engine 14 operably coupled to the rotor 30 of the alternator 16 induces the rotor 30 to rotate within the stator 32 of the alternator 16 over time. The rotor 30 has a field coil 60. The stator 32 outputs a voltage and a current in response to the rotation of the rotor 30.

At step 192, the microprocessor 98 in the voltage regulator 48 of the alternator 16 determines a first value indicative of an amount of current being output by the stator 32 of the alternate 16 at substantially a first time.

At step 194, the microprocessor 98 determines a second value indicative of an amount of current being output by the stator 32 at a second time. The second time is after the first time.

At step 196, the microprocessor 98 makes a determination as to whether an absolute value of (second value — first value)) is greater than a threshold value. If the value of step 196 equals "yes", the method advances to step 198. Otherwise, the method returns to step 190.

At step 198, the microprocessor 98 makes a determination as to whether the second value is greater than the first value.

If the value of step 198 equals "yes", the method advances to step 200. Otherwise, the method advances to step 202.

At step 200, the microprocessor 98 decreases the duty cycle of the signal being applied to the field coil 60 of the rotor 30 to decrease the amount of torque loading of the alternator 16 on the engine 14 such that the amount of torque loading is maintained with a desired torque loading range. After step 200, the method returns to step 190.

At step 202, the microprocessor 98 increases the duty cycle of a signal being applied to the field coil 60 of the rotor 30 to increase the amount of torque loading of the alternator 16 on the engine 14 such that the amount of torque loading is maintained with a desired torque loading range. After step 202, the method returns to step 190.

Figure 10:
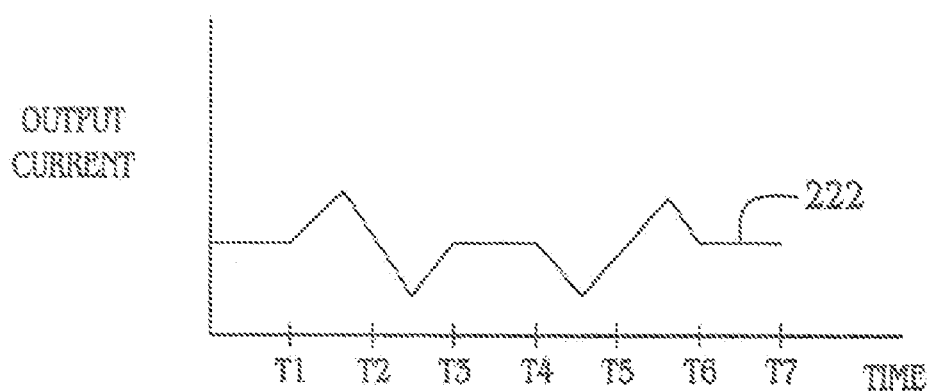
FIG. 10 is an exemplary output current signal schematic associated with the alternator of FIG. 1.
Figure 11:
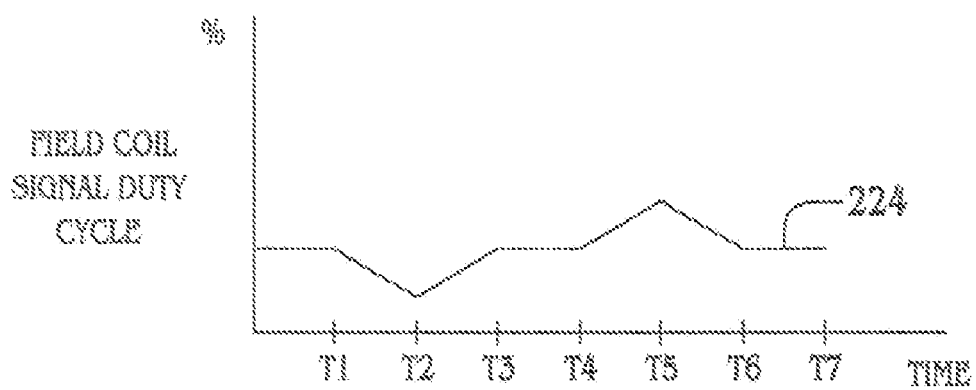
FIG. 11 is an exemplary field coil signal duty cycle schematic associated with the alternator of FIG. 1.
Figure 12:
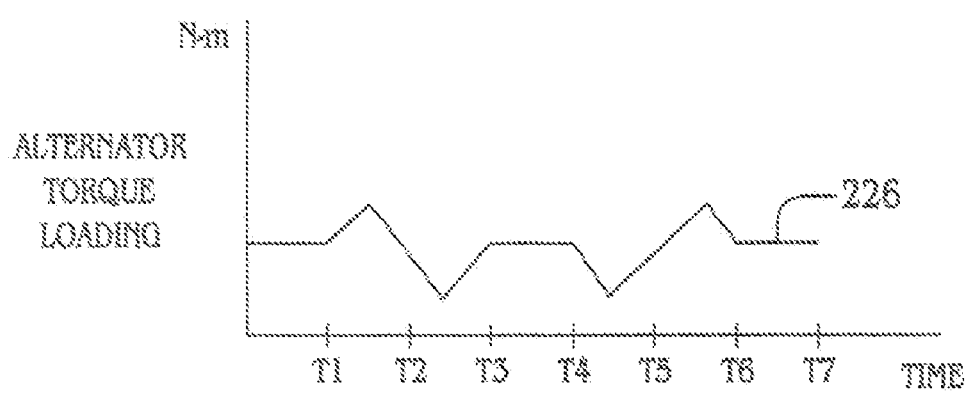
FIG. 12 is an exemplary alternator torque loading signal schematic associated with the alternator of FIG. 1.

Referring to FIGS. 10-12, a brief description of exemplary signals that may be generated by the vehicle 10 utilizing the method of FIG. 9 will now be discussed. The signal curve 222 indicates an output current of the alternator 16 over the time interval. The signal curve 224 indicates a duty cycle of a signal applied to the field coil 60 over the time interval. The signal curve 226 indicates a relative torque loading of the alternator 16 on the engine 14 over the time interval.

As illustrated, between times T1 and T2, the curve 222 indicates the output current of the alternator 16 increases. The curve 224 indicates the microprocessor 98 decreases the duty cycle of the signal applied to the field coil 60, in response to the increasing output current. Further, the curve 226 indicates the torque loading of the alternator 16 is adjusted within a desired range based on the output current of the alternator 16.

Further, as illustrated, between times T2 and T3, the curve 222 indicates the output current of the alternator 16 decreases. The curve 224 indicates the microprocessor 98 increases the duty cycle of the signal applied to the field coil 60, in response to the decreasing output current. Further, the curve 226 indicates the torque loading of the alternator 16 is adjusted within a desired range based on the output current of the alternator 16.

The methods for controlling an amount of torque loading of the alternator 16 on the engine 14 can be at least partially embodied in the form of computer-implemented software algorithms and apparatuses for practicing those processes. In an exemplary embodiment, the method is at least partially embodied in computer program code executed by the microprocessor 98. The present method may be embodied in the form of computer program code containing instructions stored in tangible media, such as the memory device 99, or any other computer-readable storage medium, wherein, when the computer program code is loaded into and executed by the microprocessor 98, the microprocessor 98 becomes an apparatus for practicing the invention.

The vehicle alternator 16 and the methods for controlling an amount of torque loading of the vehicle alternator 16 on the engine 14 provide a substantial advantage over other alternators and methods. In particular, the vehicle alternator 16 utilizes a microprocessor to control an amount of torque loading based on a rotational speed of a rotor of the alternator 16 and/or an amount of current output by the alternator 16.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Further, the use of the terms a, an, etc. do not denote a limitations of quantity, but rather denote the presence of at least one of the referenced item.

What is claimed is:

1. A method for controlling an amount of torque loading of a vehicle alternator on an engine, the alternator having a rotor, a stator, and a voltage regulator, the voltage regulator having a microprocessor, the method comprising:
   determining a first value indicative of a rotational speed of the rotor at the first time, utilizing the microprocessor in the voltage regulator;
   determining a second value indicative of an amount of current being output by the stator of the alternator at substantially the first time, utilizing the microprocessor;
   determining a first torque loading value that is indicative of a relative amount of torque loading associated with the alternator, based on first and second values, utilizing the microprocessor;
   determining a third value indicative of a rotational speed of the rotor at a second time, utilizing the microprocessor, the second time being after the first time;
   determining a fourth value indicative of an amount of current being output by the stator of the alternator at substantially the second time, utilizing the microprocessor;
   determining a second torque loading value that is indicative of the relative amount of torque loading associated with the alternator, based on third and fourth values, utilizing the microprocessor; and
   adjusting a duty cycle of a signal being applied to the field coil of the rotor based on the first and second torque loading values such that the amount of torque loading of the alternator is maintained within a desired torque loading range.

2. The method of claim 1, wherein determining the first value indicative of the rotational speed of the rotor at the first time, comprises:
   determining a frequency of an AC phase voltage of the stator of the alternator; and
   determining the first value indicative of the rotational speed of the rotor based on the frequency of the AC phase voltage of stator.

3. The method of claim 1, wherein adjusting the duty cycle of the signal being applied to the field coil of the rotor comprises:
   increasing the duty cycle of the signal being applied to the field coil of the rotor, when a difference between the first and second torque loading values is greater than a threshold value, and the second torque loading value is less than the first torque loading value, utilizing the microprocessor.

4. The method of claim 1, wherein adjusting the duty cycle of the signal being applied to the field coil of the rotor comprises:
   decreasing the duty cycle of the signal being applied to the field coil of the rotor, when a difference between the first and second torque loading values is greater than a threshold value, and the second torque loading value is greater than the first torque loading value, utilizing the microprocessor.

5. A vehicle alternator, comprising:

a rotor having a field coil;

a stator operably disposed around the rotor, the stator configured to output a voltage in response to rotation of the rotor; and a voltage regulator having a microprocessor operably coupled to the stator, the microprocessor configured to determine a first value indicative of a rotational speed of the rotor at the first time, the microprocessor further configured to determine a second value indicative of an amount of current being output by the stator of the alternator at substantially the first time, the microprocessor further configured to determine a first torque loading value that is indicative of a relative amount of torque loading associated with the alternator, based on first and second values, the microprocessor further configured to determine a third value indicative of a rotational speed of the rotor at a second time, the second time being after the first time, the microprocessor further configured to determine a fourth value indicative of an amount of current being output by the stator of the alternator at substantially the second time, the microprocessor further configured to determine a second torque loading value that is indicative of the relative amount of torque loading associated with the alternator based on third and fourth values, the microprocessor further configured to adjust a duty cycle of a signal being applied to the field coil of the rotor based on the first and second torque loading values such that an amount of torque loading of the alternator is maintained within a desired torque loading range.

6. The vehicle alternator of claim 5, wherein the microprocessor is further configured to determine a frequency of an AC phase voltage of the stator of the alternator, the microprocessor being further configured to determine the first value indicative of the rotational speed of the rotor based on the frequency of the AC phase voltage of the stator.

7. The vehicle alternator of claim 5, wherein the microprocessor is configured to increase the duty cycle of the signal being applied to the field coil of the rotor, when a difference between the first and second torque loading values is greater than a threshold value, and the second torque loading value is less than the first torque loading value.

8. The vehicle alternator of claim 5, wherein the microprocessor is configured to decrease the duty cycle of the signal being applied to the field coil of the rotor, when a difference between the first and second torque loading values is greater than a threshold value, and the second torque loading value is grater than the first torque loading value.

9. A method for controlling an amount of torque loading of a vehicle alternator on an engine, the alternator having a rotor, a stator, and a voltage regulator, the voltage regulator having a microprocessor, the method comprising:

determining a first value indicative of an amount of current being output by the stator of the alternator at substantially the first time, utilizing the microprocessor in the voltage regulator;

determining a second value indicative of an amount of current being output by the stator at a second time, utilizing the microprocessor, the second time being after the first time; and adjusting a duty cycle of a signal being applied to the field coil of the rotor based on the first and second values such that the amount of torque loading of the alternator is maintained within a desired torque loading range, utilizing the microprocessor.

10. The method of claim 9, wherein adjusting the duty cycle of the signal being applied to the field coil of the rotor comprises increasing the duty cycle of the signal being applied to the field coil of the rotor, when a difference between the first and second values is greater than a threshold value, and the second value is less than the first value, utilizing the microprocessor.

11. The method of claim 9, wherein adjusting the duty cycle of the signal being applied to the field coil of the rotor comprises decreasing the duty cycle of the signal being applied to the field coil of the rotor, when a difference between the first and second values is greater than a threshold value, and the second value is greater than the first value, utilizing the microprocessor.

12. A vehicle alternator, comprising:

a rotor having a field coil;

a stator operably disposed around the rotor, the stator configured to output a voltage in response to rotation of the rotor; and a voltage regulator having a microprocessor operably coupled to the stator, the microprocessor configured to determine a first value indicative of an amount of current being output by the stator of the alternator at substantially the first time, the microprocessor further configured to determine a second value indicative of an amount of current being output by the stator at a second time, the second time being after the first time, the microprocessor further configured to adjust a duty cycle of a signal being applied to the field coil of the rotor based on the first and second values such that the amount of torque loading of the alternator is maintained within a desired torque loading range.

13. The vehicle alternator of claim 12, wherein the microprocessor is configured to increase the duty cycle of the signal being applied to the field coil of the rotor, when a difference between the first and second values is grater than a threshold value, and the second value is less than the first value.

14. The vehicle alternator of claim 12, wherein the microprocessor is configured to decrease the duty cycle of the signal being applied to the field coil of the rotor, when a difference between the first and second values is greater than a threshold value, and the second value is greater than the first value.

* * * * *